(12) United States Patent
Nagar et al.

(10) Patent No.: US 8,649,575 B2
(45) Date of Patent: Feb. 11, 2014

(54) METHOD AND APPARATUS OF A GESTURE BASED BIOMETRIC SYSTEM

(75) Inventors: Abhishek Nagar, Lansing, MI (US);
Kaushik Josiam, Dallas, TX (US);
Farooq Khan, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

(21) Appl. No.: 13/213,951

(22) Filed: Aug. 19, 2011

(65) Prior Publication Data

US 2012/0051605 A1    Mar. 1, 2012

Related U.S. Application Data

(60) Provisional application No. 61/376,563, filed on Aug. 24, 2010.

(51) Int. Cl.
*G06K 9/62* (2006.01)
(52) U.S. Cl.
USPC ............................................. 382/124
(58) Field of Classification Search
None
See application file for complete search history.

(56) References Cited

U.S. PATENT DOCUMENTS

2004/0012682 A1*  1/2004  Kosaka et al. ........... 348/207.99
2009/0169070 A1*  7/2009  Fadell ........................... 382/124

FOREIGN PATENT DOCUMENTS

WO    WO 2009131539 A1 * 10/2009 ............... G06F 3/01

OTHER PUBLICATIONS

D. G. Joshi et al., "Computer Vision-Based Approach to Personal Identification Using Finger Crease Pattern", Pattern Recognition, vol. 31, No. 1, pp. 15-22, 1998, Elsevier Science Ltd.*
Sung Kwan et al., "Color Based Hand and Finger Detection Technology for User Ineteraction", International Conference on Convergence and Hybrid Information Technology, 2008, IEEE, pp. 229-236.*

* cited by examiner

*Primary Examiner* — Brian P Werner
(74) *Attorney, Agent, or Firm* — Jefferson IP Law, LLP

(57) ABSTRACT

An apparatus and method for detecting a finger are provided. The method includes capturing an image of a finger, generating a likelihood image of the finger from the captured image, localizing the finger within the likelihood image, determining a boundary of the finger, determining a location of one or more creases of the finger, and comparing the determined location of the one or more creases with crease locations of a finger image stored in a database.

32 Claims, 9 Drawing Sheets

METHOD AND APPARATUS OF A GESTURE BASED BIOMETRIC SYSTEM

CROSS-REFERENCE TO RELATED APPLICATIONS

This application claims the benefit under 35 U.S.C. §119(e) of a U.S. Provisional application filed on Aug. 24, 2010 in the U.S. Patent and Trademark Office and assigned Ser. No. 61/376,563, the entire disclosure of which is hereby incorporated by reference.

BACKGROUND OF THE INVENTION

1. Field of the Invention

The present invention relates to an apparatus and method for providing a biometric input for a portable terminal. More particularly, the present invention relates to an apparatus and method for recognizing a gesture as an input for a portable terminal.

2. Description of the Related Art

Portable terminals are becoming increasingly popular based on the additional and advanced features they provide in conjunction with their mobility. As advances continue to be made regarding features provided by the portable terminal, user interface design trends indicate that intuitive interface and simple interactions are also becoming increasingly popular. For example, in some instances a simple slide interface on a touch screen has replaced the traditional touch and press interface for unlocking a phone. As part of the development of intuitive interfaces, biometric recognition is being explored as a fast and convenient means to augment current user authentication and user interaction mechanisms. Biometric recognition or biometrics is a field of study that allows for recognition of an individual based on their biological and/or behavioral traits such as a fingerprint, a face, a hand, an iris, etc.

User interaction with a portable terminal can typically be categorized in two basic modes—user authentication and user input. User authentication has two basic purposes. The first is to validate the presence of the user and the second is to ensure that the user has the authority to use the phone. The first purpose, to validate the presence of the user, is to avoid an unintended execution of a function, such as avoiding the dialing of a number due to a random and unintended interaction of the portable terminal with its environment. This basic functionality is currently being provided by requiring the user to press two or more specific keys in order to unlock the phone. The second purpose, which is increasingly becoming more important with the diversification of the portable terminal as a lifestyle device, is ensuring device security. To discourage an unauthorized user, the user of the portable terminal is required to input a password to unlock the phone. User interaction is currently limited to key presses or a mouse pointer on a touch screen. However, on such a touch screen, there are basic limitations that arise from the small size of the device. Further, such an interface cannot be easily used in applications requiring 3-Dimensional (3D) scene navigation.

Use of a camera has been proposed for augmenting the user interface. For example, the prior art discloses a user interface in which the user swipes his/her finger across the camera and the direction of the swipe determines the response input to the device. As an example, a cursor may be moved in a direction corresponding to the swipe. The system of the prior art has two embodiments. In the first embodiment, the user must swipe his/her finger on the camera while the finger is in contact with the camera. A limitation of this implementation is that it is inconvenient for the user to locate the camera, especially if it is on the back side of the cell phone. In the second embodiment, the user can sway his/her finger in front of the camera in order to achieve the same effect. However, the system may not specifically recognize the finger, especially if there is a significant movement in the background, which may lead to a false positive.

A natural extension of this system is to recognize the user's finger using techniques available in the biometric recognition literature. That is, the prior art provides an exhaustive review of available biometric recognition techniques. However, a limitation of the biometric recognition techniques is that the sensors used to capture biometric features are specialized to the application in order to acquire high quality captures and thus are very expensive as compared to the generic components used in a portable terminal. That is, known methods of extracting biometric information from a user require using a specialized sensor. However, because the price of these special sensors is so high, their use is effectively prohibited in a portable terminal. Accordingly, there is a need for an apparatus and method that provides for biometric recognition while maintaining costs at a reasonable level. Moreover, there is a need for an apparatus and method that provides a biometric sensor using a camera of a portable terminal. Given that cameras in portable terminals are ubiquitous, incorporating the proposed biometric sensing will add value without adding complexity.

SUMMARY OF THE INVENTION

Aspects of the present invention are to address at least the above-mentioned problems and/or disadvantages and to provide at least the advantages described below. Accordingly, an aspect of the present invention is to provide an apparatus and method for providing a biometric input for a portable terminal.

Another aspect of the present invention is to provide an apparatus and method for recognizing a gesture as an input for a portable terminal.

Still another aspect of the present invention is to provide an apparatus and method for recognizing a gesture using currently available imaging sensors of a portable terminal.

In accordance with an aspect of the present invention, a method of a portable terminal for detecting a finger is provided. The method includes capturing an image of a finger, generating a likelihood image of the finger from the captured image, localizing the finger within the likelihood image, determining a boundary of the finger, determining a location of one or more creases of the finger, and comparing the determined location of the one or more creases with crease locations of a finger image stored in a database.

In accordance with another aspect of the present invention, an apparatus for detecting a finger is provided. The apparatus includes an imaging sensor for capturing an image of a finger, and a computing system for generating a likelihood image of the finger from the captured image, for localizing the finger within the likelihood image, for determining a boundary of the finger, for determining a location of one or more creases of the finger, and for comparing the determined location of the one or more creases with crease locations of a finger image stored in a database.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
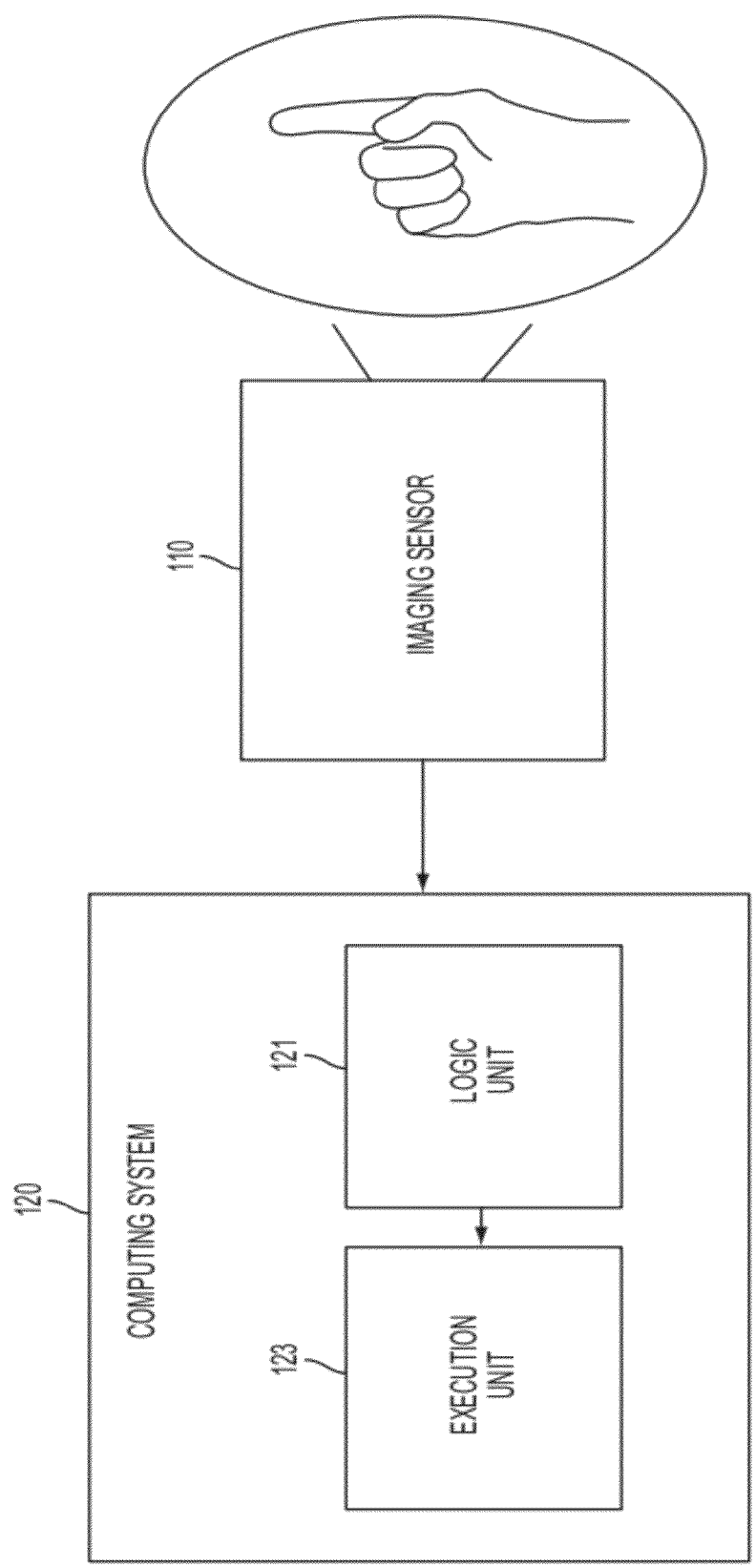
FIG. 1 illustrates a gesture based biometric system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include an apparatus and method for implementing a biometric system using a low cost imaging sensor. An example of such a low cost imaging sensor is a camera included in a currently available portable terminal. In an exemplary implementation, a feature of the biometric system includes recognition of a gesture from a user and the performance of various functions based on the recognized gesture. In an exemplary embodiment, the gesture is a pointed finger oriented such that it occupies a large area of an image captured by the imaging sensor.

A biometric system according to exemplary embodiments of the present invention may have numerous uses. For example, an image captured by the biometric system may be used as an input to authenticate a user, to execute a desired application, to control tasks of an executing application, and the like. As another example, an image captured by the biometric system may be used as a control input, wherein the apparatus can be used to accurately detect a position, size and orientation of the finger in order to provide the user with a motion control mechanism having four degrees of freedom. As an example, such motion control can be used to move objects in a scene rendered on a display of the portable device. As a means to execute a desired application, the apparatus can identify the finger presented and can launch different applications based on the identified finger. For example, the index finger may launch an email client whereas the ring finger may launch a gaming program. That is, different fingers may be mapped to different applications. Also, the apparatus can identify the finger presented among various fingers enrolled in a database and can authenticate the captured image as belonging to a user that is authorized to operate the system. Once the user is authenticated, the finger presented can then be used to perform additional functions, such as launching a program, controlling an input, and the like.

The following exemplary embodiments of the present invention are described as applied to a "portable terminal." However, it is to be understood that this is merely a generic term and that the invention is equally applicable to any of a mobile phone, a palm sized Personal Computer (PC), a Personal Communication System (PCS), a Personal Digital Assistant (PDA), a Hand-held PC (HPC), a smart phone, an International Mobile Telecommunication 2000 (IMT-2000) terminal, a wireless Local Area Network (LAN) terminal, a laptop computer, a netbook, and the like. Accordingly, use of the term "portable terminal" should not be used to limit application of the present inventive concepts to any certain type of apparatus or device.

FIG. 1 illustrates a gesture based biometric system according to an exemplary embodiment of the present invention.

Referring to FIG. 1, the apparatus includes an imaging sensor 110 and a computing system 120. The imaging sensor 110 is a low cost, low resolution imaging sensor. An example of such a low cost imaging sensor is a camera that is currently available and typically integrated into a portable terminal or a web camera connected to a computer. Low resolution implies small image sizes. In an exemplary implementation, the smallest resolution supported by the system is 240 pixels by 320 pixels. The imaging sensor 110 may include a camera sensor (not shown) for capturing an image and converting an optical signal corresponding to the captured image into an analog electrical signal. The imaging sensor 110 may also include a signal processor (not shown) for converting the analog electrical signal into digital data. The imaging sensor 110 may be a Charge-Coupled Device (CCD) sensor or a Complementary Metal-Oxide-Semiconductor (CMOS) sensor, and the signal processor may be a Digital Signal Processor (DSP). The imaging sensor 110 and the signal processor may be realized as separate entities or as a single entity. During use, the imaging sensor 110 captures an image of a user's finger and provides the image to the computing system 120.

The computing system 120 includes a logic unit 121 and an execution unit 123. The logic unit 121 is provided for tracking, identifying and authenticating the captured image received from the imaging sensor 110 and for providing an output based on the captured image to the execution unit 123. The output provided by the logic unit 121 may include logic for triggering a preferred action such as unlocking the portable terminal, launching different applications etc. The execution unit 123 may be a general or specific control unit located within the portable terminal. The execution unit 123 receives logical input from the logic unit 121 and executes a function based on the received logic.

In the following description, the term "biometric system" denotes a combination of the imaging sensor and the programming logic for tracking, identification and authentication.

In an exemplary implementation, the biometric system of FIG. 1 may be incorporated into a laptop computer equipped with a web camera. That is, the laptop computer may include a logic unit 121 for tracking, identifying and authenticating a presented gesture as captured by the web camera (i.e., imaging sensor 110) and for providing a logical output to an execution unit 123 for executing a related function. Also, the logic unit 121 can be a code running in the background, hardware logic specialized for this function, or embedded logic in a digital signal processor. Similarly, the biometric system of FIG. 1 may be incorporated into a smart phone equipped with a camera. That is, the smart phone may include a logic unit 121 for tracking, identifying and authenticating a presented gesture as captured by the phone's camera (i.e., imaging sensor 110) and for providing a logical output to an execution unit 123 for executing a related function. The logic unit 121 can be a code running in the background, hardware logic specialized for this function, or embedded logic in a digital signal processor. Of course, these are merely two examples illustrating potential implementation of the invention and are not intended as limitations. Rather, as discussed above, the present invention has applicability to a wide variety of devices.

In an exemplary embodiment, a button may be placed on the portable terminal that can be used to activate the system. It is noted however that if the system were running unattended, it would consume significant battery power. Thus, the system would be controlled to run unattended only if it were connected to a power source. Moreover, the system should start working only when a response is expected from the user in the next few seconds in terms of presenting a finger. For example, when the cell phone rings, the imaging sensor should start capturing frames and try to detect the finger placed in front of it in order to detect a gesture corresponding to a command to answer the phone, ignore the call, and the like.

The following description will first illustrate modes of operation of the invention and will then illustrate more detail regarding means (i.e., algorithms, structures, etc.) to accomplish these modes. The separation of modes from means is provided for conciseness of description. That is, while certain of the means have applicability to a plurality of the modes, only one description of each will be provided for brevity.

Figure 2:
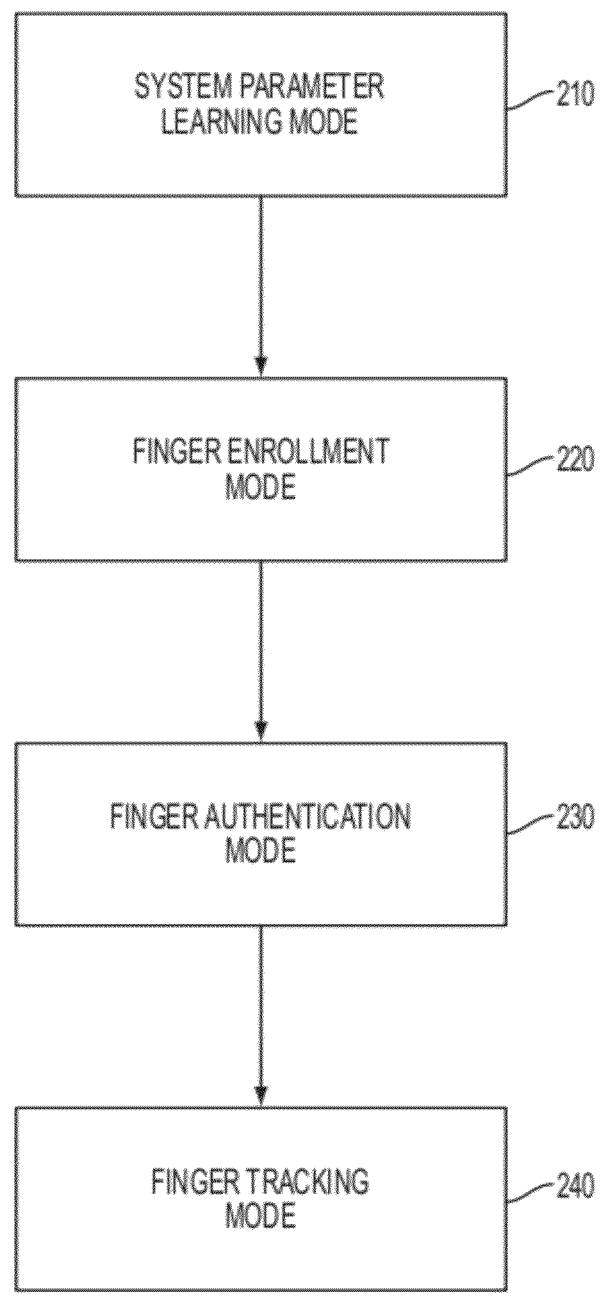
FIG. 2 illustrates basic modes of operating a biometric system according to an exemplary embodiment of the present invention.
Figure 3:
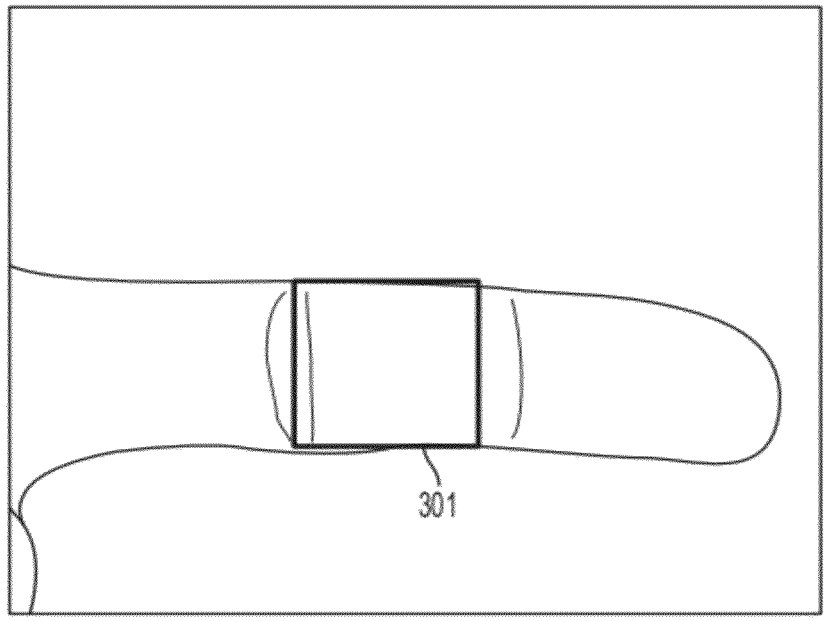
FIG. 3 illustrates a system parameter learning mode according to an exemplary embodiment of the present invention.
Figure 4:
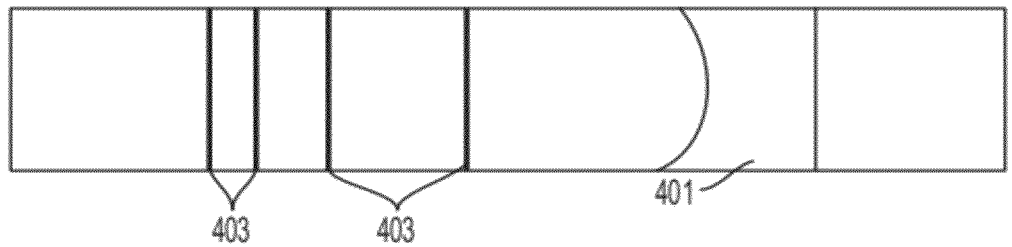
FIG. 4 illustrates a finger enrollment mode according to an exemplary embodiment of the present invention.
Figure 5:
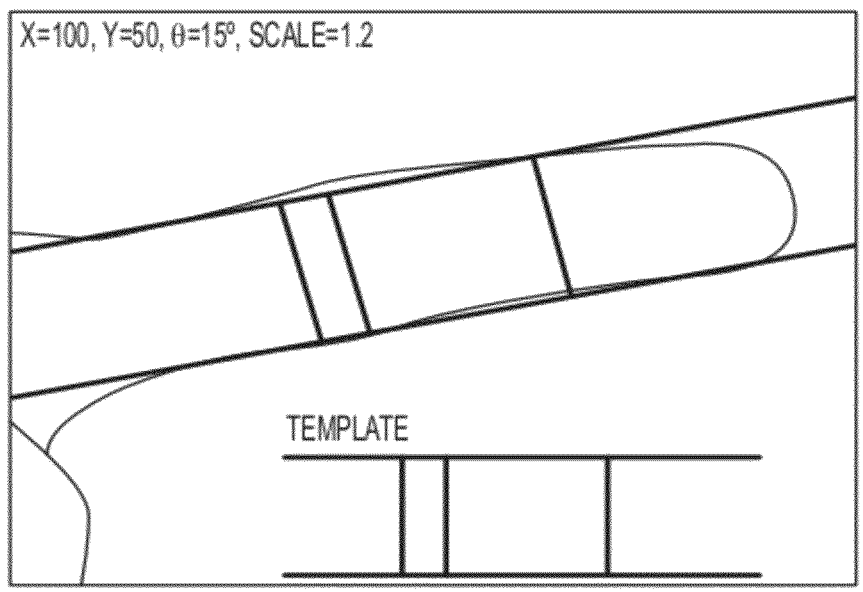
FIG. 5 illustrates a finger tracking mode according to an exemplary embodiment of the present invention.

FIG. 2 illustrates basic modes of operating a biometric system according to an exemplary embodiment of the present invention. FIG. 3 illustrates a system parameter learning mode according to an exemplary embodiment of the present invention. FIG. 4 illustrates a finger enrollment mode according to an exemplary embodiment of the present invention. FIG. 5 illustrates a finger tracking mode according to an exemplary embodiment of the present invention.

Referring to FIG. 2, the basic operating modes of the biometric system include a system parameter learning mode 210, a finger enrollment mode 220, a finger authentication mode 230, and a finger tracking mode 240. Each of the operating modes are implemented as menu driven functions that include display screens for requesting user input, for displaying results, and the like.

The system parameter learning mode 210 includes the capturing of an image using an imaging sensor of the biometric system. More specifically, the imaging sensor captures a sample of a finger region and determines the color represented by the finger region. As illustrated in FIG. 3, an exemplary system parameter learning mode 210 involves an active user input, such as a menu driven process of the portable terminal, assisted by a rectangle 301 displayed on a screen of the portable terminal that is displaying frames streamed through the imaging sensor. In an exemplary implementation, the rectangle 301 has a size of 50 pixels×50 pixels and is displayed in the center of the screen. As part of the active user input, the user is asked to place his/her finger in front of the imaging sensor such that the rectangle 301 is covered by the finger as shown in FIG. 3. The user can then press a key on an input unit of the portable terminal to indicate that the rectangular region is completely covered by the finger. This process can be repeated a plurality of times (e.g., 20-30 times) under different lighting conditions in order to capture a variety of skin tones.

In an exemplary embodiment, the system parameter learning mode 210 may involve a machine learning technique such as a neural network, a decision tree based classifier, and a support vector machine based classifier, any of which can be used to determine the skin color from an obtained database of skin swatches. The skin swatches can also be captured offline, without active user input, from different sources including digital pictures.

In the finger enrollment mode 220, a database of reference finger images is created using the biometric system. That is, in the finger enrollment mode 220, the finger images of authorized users of the system are registered in a database. In an exemplary implementation, the database is local to the portable terminal. However, the database may also be remotely accessed. In the finger enrolment mode 220, a user is requested to present his/her finger in front of the imaging sensor. As illustrated in FIG. 4, the system locates the finger using a detection algorithm (explained below) and displays a rectangle 401 around the identified finger region.

As also illustrated in FIG. 4, the creases 403 in the finger are detected and used for aligning the finger to a desired frame of reference. If the finger is correctly captured and the major creases of the finger are correctly marked by the biometric system, the user can enter a number from 0-9 indicating the specific finger presented. For example, the number 1 may be entered to indicate the ring finger of the left hand. Of course, it is understood that this numbering system for each of the ten fingers is merely an example and that the invention envisions many others. For example, the portable terminal may output a menu list including all possible fingers from which the user will select the appropriate finger that matches the captured image. The finger thus captured is stored along with its unique identification label in the local database.

In another exemplary embodiment, the biometric system locates the finger using a detection algorithm (explained below) that includes displaying the rectangle 401 around the finger region. In an exemplary implementation, the biometric system also provides an identity of the finger region (i.e., ring finger, left hand). The user is then called upon to verify if the finger is correctly identified by the algorithm (i.e., correct identification of a ring finger). If the correct finger is identified, the user is further requested to manually mark the creases 403 in the finger that will be the discriminatory feature used to identify the finger. The finger thus captured is stored along with its unique identification label in the local database. Alternatively, the biometric system may simply request the user to identify the finger without executing a detection algorithm. For example, the biometric system may display a list of all possible finger types from which the user will make a selection that matches the captured image. After the user identifies the finger type, the user may then be requested to manually mark the creases 403 of the identified finger. The captured image of the finger is stored in the database along with its unique identification label.

In the finger authentication mode 230, users are authenticated by comparing an image of a finger captured by an imaging sensor with the images enrolled in the database. In a first step of the finger authentication mode 230, the biometric system attempts to identify any finger that is present in the image captured by the imaging sensor using a detection algorithm (described below). The identified finger is then compared with finger images stored in the local database and a match score is computed using a scoring algorithm (described below). Using the computed score, the biometric system outputs a decision which could be one of two: a "no finger detected" signal or the identity of the detected finger.

In the finger tracking mode 240, the biometric system follows a procedure to align the finger to a stored template. However, rather than matching the aligned finger segment to the one stored, the alignment parameters (i.e., x-translation, y-translation, rotation, and scaling) are extracted from the system. These values can be used to translate, rotate, and scale an object displayed on the portable terminal such as a photograph being displayed on the screen. Such values can also be used to launch or otherwise control an application, and the like. FIG. 5 illustrates a finger present in the image and the four degrees of freedom i.e. x-translation, y-translation, rotation and scaling extracted by aligning the finger with template crease pattern available in the database.

The different modes of operating the biometric system as described above each involve one or more components of a detection algorithm, exemplary embodiments of which are described below. That is, as will be explained in more detail below, a detection algorithm includes several components or steps, some of which are used in one or more of the operating modes of the biometric system and some of which are unique to a specific mode.

Figure 6:
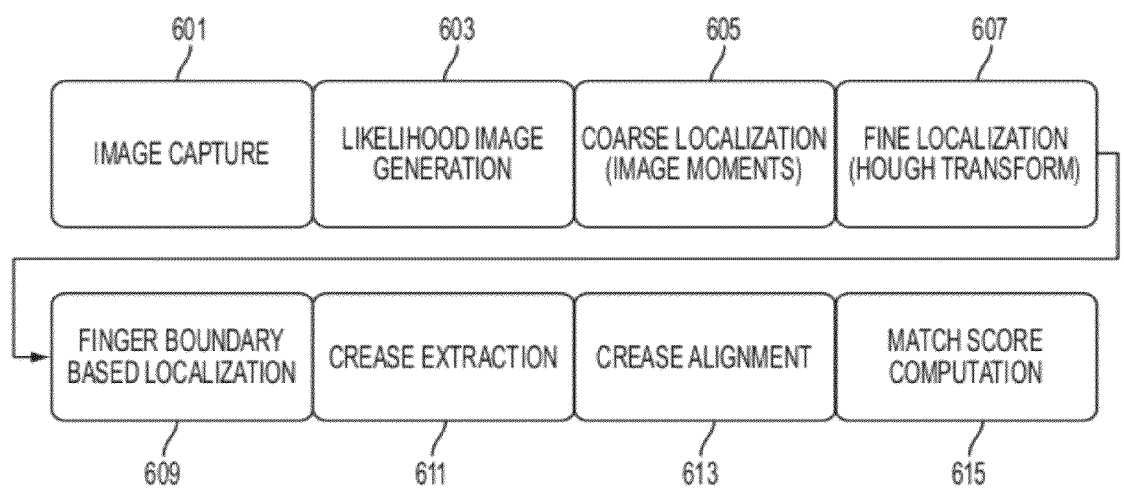
FIG. 6 illustrates steps of a detection algorithm for use in a biometric system according to an exemplary embodiment of the present invention.

FIG. 6 illustrates steps of a detection algorithm for use in a biometric system according to an exemplary embodiment of the present invention.

Referring to FIG. 6, a detection algorithm includes an image capture step 601, a likelihood image generation step 603, a coarse localization step 605, a fine localization step 607, a finger boundary based localization step 609, a crease extraction step 611, a crease alignment step 613, and a matching step 615.

The image capture step 601 includes a well known function of a portable terminal in which a user captures an image. An image is typically captured by means of selecting an image capture function of the portable terminal and selection of an image capturing button. As described above with reference to FIG. 1, a portable terminal includes an imaging sensor 110 that may be used to capture an image.

The likelihood image generation of step 603 uses a color-likelihood based approach to detect the skin region. In an exemplary implementation, the process of the likelihood image generation involves the following steps. First, the skin-likeliness of each pixel of the image captured by the imaging sensor is computed. This requires a probability density function of skin color in a desirable color space. For this purpose, the hue and saturation components of the color are selected. It is noted that this probability density is required to be computed only once during the system parameter learning mode 210 and can be done either online using active user input or offline. Also, the probability density function can be updated for different lighting conditions.

To compute the probability density of skin color, a set of sample skin patches are collected in the system parameter learning mode 210, and all the pixels from the available patches are pooled. The histogram of this large pool of pixels (i.e., the skin-color histogram) is used as an estimate for probability density of skin color. Given a pixel color, its skin-likelihood is proportional to the value of the bin in the skin-color histogram associated with the pixel color as defined in Equation (1):

$$L(x,y)=C(h(x,y),s(x,y)) \quad (1)$$

where, x and y are horizontal and vertical coordinates respectively of the pixel being considered, L is the likelihood, C is the skin color histogram, and h and s are the hue and saturation channels of the captured image, respectively.

In order to reduce the effect of noise pixels, the likelihood is set to zero if its value is smaller than a certain threshold as defined in Equation (2).

$$L(x,y) = 0 \ \forall \ \{(x,y) \,|\, L(x,y) < \alpha \max_{(x,y)} L(x,y)\} \quad (2)$$

In an exemplary implementation, the obtained likelihood image is used to localize the finger using a three staged approach as described with reference to steps 605, 607, and 609. Once the skin likelihood image is obtained, the three stage approach is followed to localize the finger region.

In step 605, the first stage involves finger localization using image moments. Image moments have been extensively used and discussed in literature as a method of identifying the location and orientation of an object in an image. In an exemplary implementation, the image moments are used to compute the centroid and orientation of the finger region. The centroid is given by Equation (3):

$$(\bar{x}, \bar{y}) = \left( \frac{1}{m_{00}} \sum_{x,y} xL(x,y), \frac{1}{m_{00}} \sum_{x,y} yL(x,y) \right) \quad (3)$$

where L is the likelihood image and $$m_{00} = \sum_{x,y} L(x, y) \quad (4)$$

The orientation of the finger is coarsely estimated using the image moments as defined by Equation (5):

$$\Theta = \arctan(v_y/v_x) \quad (5)$$

where $(v_x, v_y)$ is the largest eigenvector of the image covariance matrix given by Equation (6):

$$H = \begin{bmatrix} \mu'_{20} & \mu'_{11} \\ \mu'_{11} & \mu'_{02} \end{bmatrix} \quad (6)$$

where $$\mu'_{pq} = 1/m_{00} \sum_{x,y} (x-\bar{x})^p (y-\bar{y})^q L(i,j) \quad (7)$$

Figure 7A:
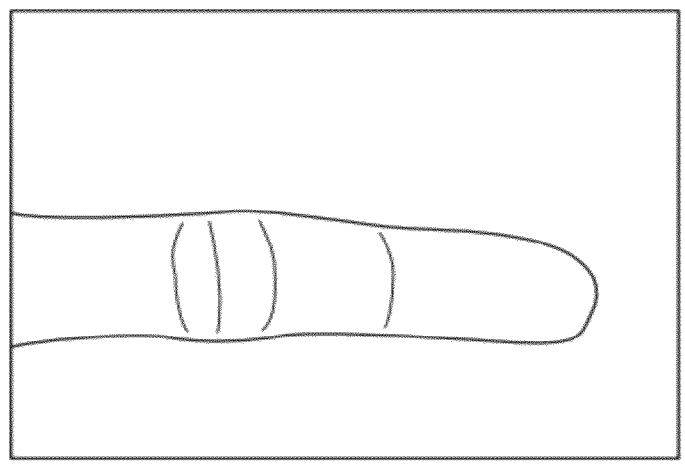
FIGS. 7A-7C illustrate a coarse localization procedure according to an exemplary embodiment of the present invention.
Figure 7B:
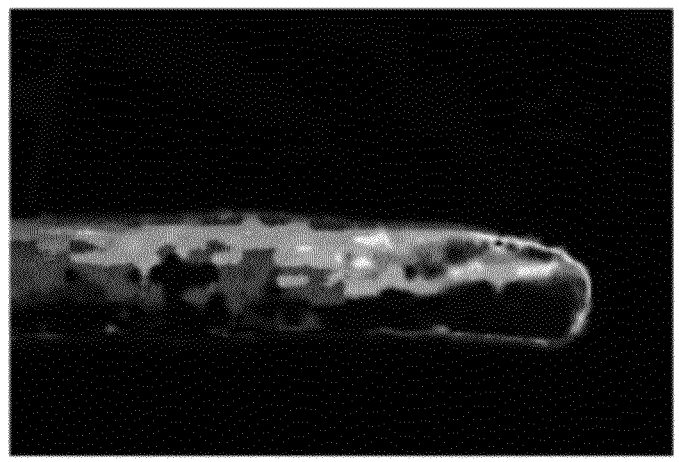
Figure 7C:
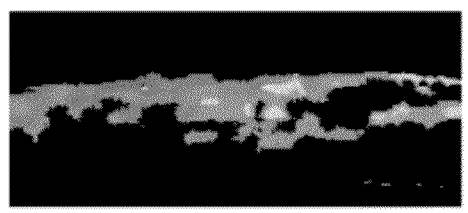

FIGS. 7A-7C illustrate a coarse localization procedure according to an exemplary embodiment of the present invention.

Referring to FIGS. 7A-7C, a rectangular region centered at $(\bar{x}, \bar{y})$ and oriented along $\Theta$ is cropped and used for further processing. More specifically, FIG. 7A illustrates a finger captured by an imaging sensor. Referring to FIG. 7B, a likelihood image L is illustrated after its production in accordance with the above described equations, and FIG. 7C illustrates a finger region extracted using an image moments based approach.

In step 607, after image localization using moments, a Hough transform based approach is used to further refine the segmentation. A Hough transform in its simplest form is a linear transform for detecting straight lines. As defined in Equation (8), a line can be represented by two parameters, the minimum distance of the line from an origin $(\rho)$ and the angle of the line from the origin with respect to the x-axis $(\theta)$.

$$x\cos(\theta) + y\sin(\theta) = \rho \quad (8)$$

As can be discerned from Equation (8), fixing x and y provides a sinusoid in the $(\rho, \theta)$ space. If there are multiple points lying on the same line, say $(\rho_l, \theta_1)$, their sinusoids will intersect at $(\rho_l, \theta_1)$ in the $(\rho, \theta)$ space. And, if each point on the sinusoid casts one vote to the corresponding $(\rho, \theta)$-bin, then the $(\rho_l, \theta_1)$-bin will receive a significantly large number of votes as compared to its neighbors and thus be easily detected. The basic Hough transform accumulates these sinusoids corresponding to all the foreground points in the image.

For each foreground pixel in the image, a vote is cast for each of $(\rho, \theta)$ pairs such that the pixel lies on the line corresponding to $(\rho, \theta)$. Finally, top k $(\rho, \theta)$ pairs accumulating the highest votes are considered as the parameters for the detected lines. Because only one finger is being recovered, only the $(\rho, \theta)$ pair corresponding to the highest value of the accumulator matrix is considered.

In an alternative embodiment, a modified Hough Transform is used. In that exemplary embodiment, two different aspects are accommodated. First, use of a real valued image instead of a binary image is allowed. Second, thick lines are detected instead of 1-pixel wide lines. In order to accommodate for the real valued image, all the non-zero values in the image are considered for voting where each vote is weighted according to the pixel value. To accommodate for the thick lines, given a pixel, in addition to voting for the $(\rho, \theta)$ pair whose line crosses the pixel, votes are also considered for the $(\rho-i, \theta)$ pairs for $i=-k, \ldots, k$ for some specified value of k. In effect, evidence for $(\rho, \theta)$ is also provided by pixels lying on lines parallel to $(\rho, \theta)$ at a distance less than or equal to k. A line passing through the center of a thick ribbon is likely to accumulate more evidence than a line near the edge.

Figure 8:
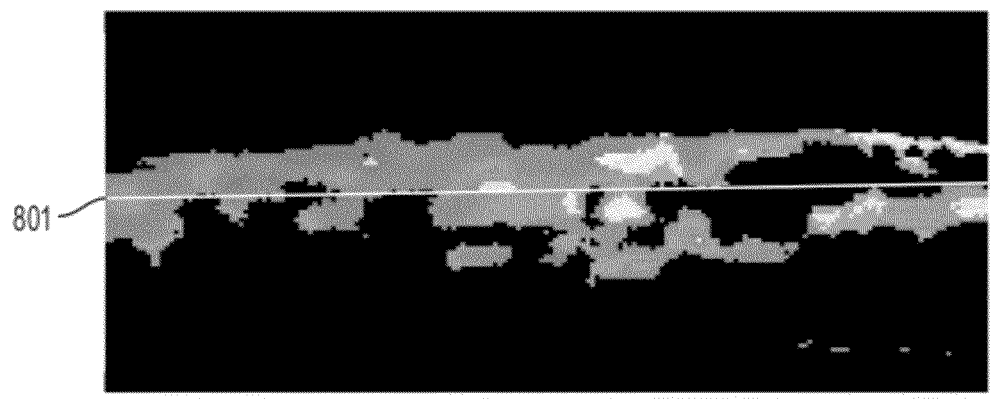
FIG. 8 illustrates results of a Hough transform according to an exemplary embodiment of the present invention.

FIG. 8 illustrates results of a Hough transform according to an exemplary embodiment of the present invention.

Referring to FIG. 8, given the $(\rho, \theta)$ value provided by the Hough transform, it is possible to extract the strip of image centered at line $(\rho, \theta)$ having a certain thickness from the original image. More specifically, FIG. 8 illustrates a rectangle extracted using image moments and the finger position and orientation as well as line 801 detected by the Hough transform based approach.

Use of only the skin likelihood image may be considered for finger localization. However, due to lighting variation, the likelihood may be unevenly distributed across the finger leading to slight deflection from the actual finger location. With step 609, this can be avoided by considering the actual image captured corresponding to the finger location by detecting the finger boundary and using the detected finger boundary for alignment. In step 609, the edge is extracted from the hue and intensity plane of the image separately using a Canny edge detector and overlaid to obtain the final edge image. It is noted that the Canny edge detector is merely an example and that any edge detection algorithm may be used. Due to alignment based on a Hough transform, in the extracted image strip containing the finger, the line along the finger direction that cuts the strip into two equal halves is expected to be inside the finger region. With this assumption, from each point on this mid-line, consecutive pixels are checked in the vertically upward and downward direction until an edge pixel is found. The two pixels detected in the upward and downward direction are considered as the boundary pixels of the finger. By applying this procedure on all the pixels on the mid-line, the top and bottom boundary of the finger is obtained. The midpoint of the two boundary pixels for each point on the mid-line are obtained and are considered to constitute the skeleton of the finger. Assuming the origin to be at the center of the finger, the finger skeleton is given by Equation (9):

$$skel(x) = \begin{cases} \dfrac{y_{top} + y_{bot}}{2} & y_{top} = \min(y \mid E(x,y) = 1, y > 0) \\ & y_{bot} = \max(y \mid E(x,y) = 1, y < 0) \\ \phi & ow \end{cases} \quad (9)$$

where $E(x,y)$ has a value 1 if $(x,y)$ is an edge pixel.

Figure 9A:
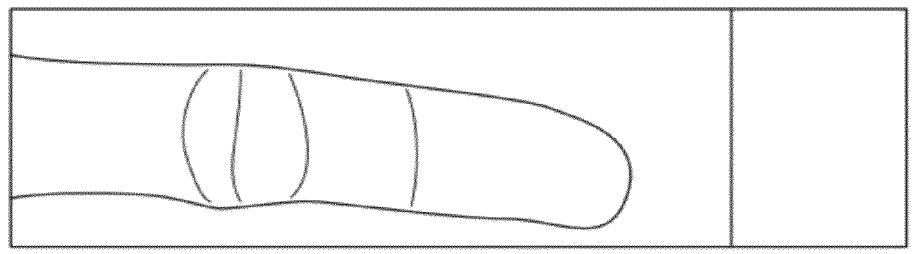
FIGS. 9A-9C illustrate images obtained during a finger boundary determination according to an exemplary embodiment of the present invention.
Figure 9B:
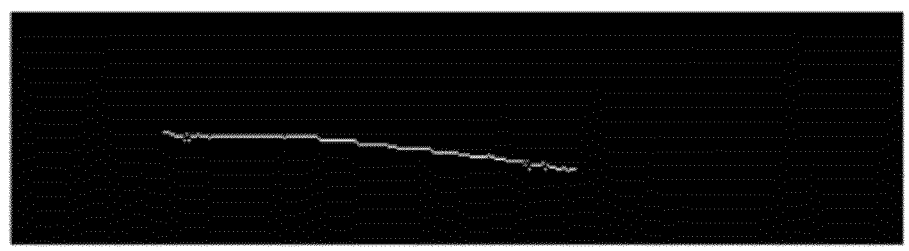
Figure 9C:
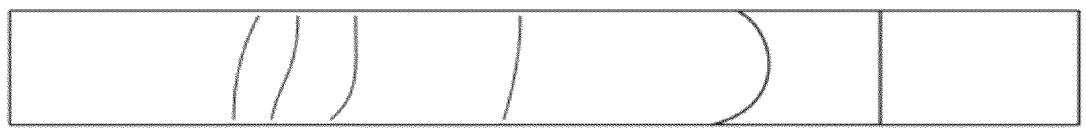

FIGS. 9A-9C illustrate images obtained during a finger boundary determination according to an exemplary embodiment of the present invention.

Referring to FIGS. 9A-9C, in order to eliminate the effect of extraneous objects in the extracted strip, portions of the rectangular strip on each side along its length are discarded. In an exemplary implementation, the discarded length is equal to 20% of the total length. Then, starting from the center, the skeleton is traced on either side horizontally until there is a discontinuity larger than a certain threshold. If the length of the continuous regions on either side of the center is greater than the certain threshold, the skeleton is considered valid and otherwise the edge based localization is discarded as it may actually degrade the localization provided by the Hough transform. The position and orientation of the skeleton is recovered by fitting a line to the skeleton in the least square sense. The extracted finger image is then again aligned along the fitted line. FIGS. 9A-9C respectively illustrate a finger strip extracted based on a Hough transform, the skeleton of the finger strip, and the finger aligned using the skeleton. It is noted that since the algorithm described does not differentiate between the finger itself and its 180° rotated version, both the finger segment and its 180° rotated version are used for matching with the stored template.

There are several alternative exemplary embodiments to those described above. For example, the modified Hough transform based technique may be directly used on the captured image without considering the image moments based finger localization. Such an approach will produce better finger localization. However, its computational cost would be high. In another alternative, edge based localization may be directly applied after the image moment based localization. This technique can be noticeably faster than the case when modified Hough transform is applied but it may lead to reduction in accuracy. As another alternative, the Hough transform can be replaced by a probabilistic Hough transform. However, while this replacement would also lead to noticeable improvement in computational efficiency, it may also reduce the accuracy of the system.

In another exemplary embodiment, the edge based alignment may be eliminated and the finger region provided by the modified Hough transform can be directly used as the final finger segment. This example can be utilized if the user is habituated and always provides the finger at a certain distance from the imaging sensor and the 'k' parameter of the modified Hough transform is appropriately tuned.

In yet another exemplary embodiment, a sophisticated image segmentation procedure such as mean-shift or normalized cut can be applied in order to obtain the finger segment and thus the finger edge. However, while this may provide better accuracy, the system thus developed would have high computational complexity.

In another exemplary embodiment, the boundaries are extracted from the objects detected in the captured image using the image segmentation techniques. In the finger enrollment mode, the system displays the boundary of each segment one at a time overlaid on the original image to the user and asks the user if the segment corresponds to the finger. The user can indicate the segment to be of the finger or not by pressing an appropriate key. If a segment is indicated by the user to belong to the finger, its boundary is stored in the system along with the image color values corresponding to the pixels inside the segment. During authentication, a segmentation procedure is again used in order to identify the various segments and the boundaries corresponding to each of these segments is matched with that corresponding to the finger stored in the system using a trimmed, iterative closest point matching technique. The alignment parameters thus obtained are then used to align the captured image to the template. A common rectangular region inside each finger segment is extracted and is matched using the procedure described below.

In step 611, finger creases are extracted for use in aligning the finger with the stored template. Creases on fingers are generally perpendicular to the length of the finger and are generally darker than the surrounding region. In order to extract the creases, a projection profile of the finger is first obtained using Equation (10):

$$Proj(x) = \sum_y I(x, y) \quad (10)$$

where I is the grayscale image strip extracted using the skeleton based alignment.

Figure 10:
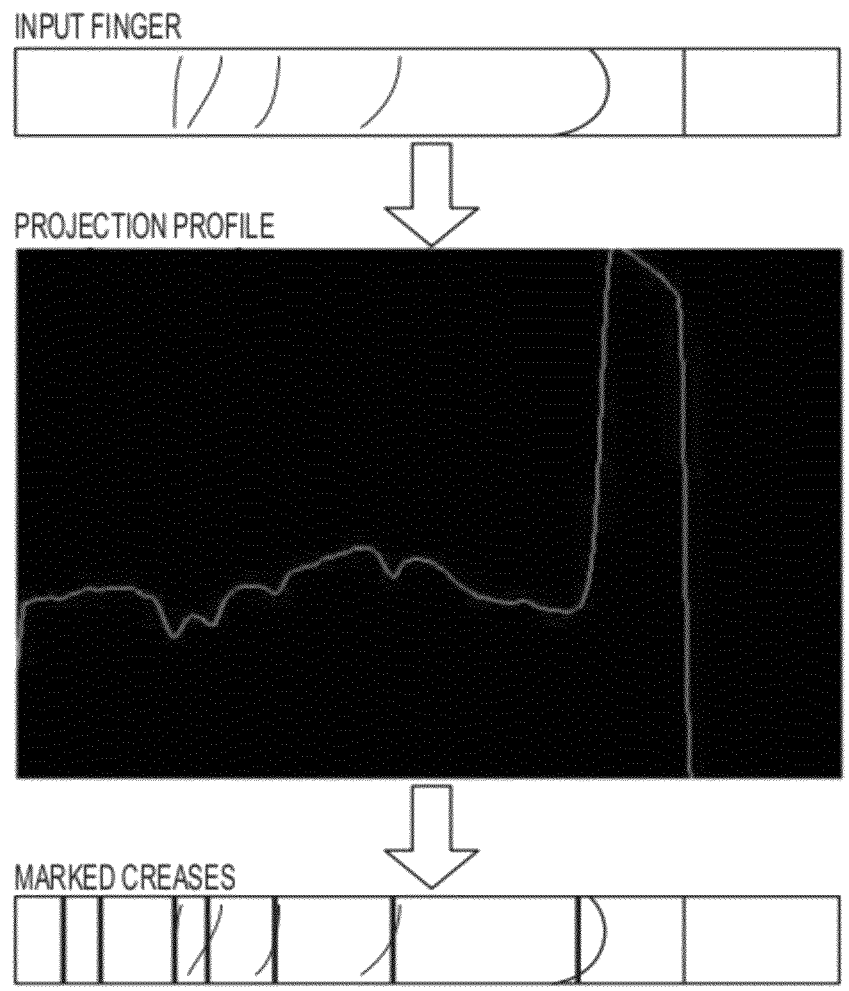
FIG. 10 illustrates a projection profile of an extracted finger according to an exemplary embodiment of the present invention.

FIG. 10 illustrates a projection profile of an extracted finger according to an exemplary embodiment of the present invention.

Referring to FIG. 10, it is observed that the troughs in the projection profile correspond to the finger creases. In an exemplary implementation, these troughs are obtained from the projection profile as follows. First, for each point, 'a', on the x-axis, a segment of a predefined length, such as 'b' pixels, centered at 'a', is considered. The area of a projection graph below a certain threshold in the segment is considered as the crease indicator ($C_{ind}$) value at point 'a' given by Equations (11) and (12).

$$C_{ind}(x) = \sum_{k=-b/2}^{b/2} f(th_{proj}(x) - Proj(x+k)) \quad (11)$$

$$th_{proj}(x) = \min(Proj(x - b/2), Proj(x + b/2)), \quad (12)$$

$$f(a) = \begin{cases} 0 & \text{if } a < 0 \\ a & \text{if } a > 0 \end{cases}$$

FIG. 10 also illustrates the projection profile and the crease indicator function computed from the projection profile.

Next, peaks are identified in the crease indicator function using a simple procedure which checks if the first non-equal values on the left and right of a point are smaller than the value itself. If there are two peaks sufficiently close to each other, then only one of them is considered. Given the set of all the peaks identified, the top seven peaks having the highest value for $C_{ind}$ are considered for further processing. Notably, a finger usually has four major creases and the choice of the number of creases selected is governed by the expected amount of spurious creases detected in the finger with a high $C_{ind}$ value.

In step 613, each pair of creases in the captured finger is aligned with each pair of the stored template. For each such alignment, which involves scaling and translation of the finger, Equation (13) is used to compute the fitness score of the alignment:

$$\text{fitness}(i) = \sum_i (th - d(c_i^q))w(c_i^q) \quad (13)$$

$$d(c_i^q) = \begin{cases} \min_j(|c_i^q - c_j^t|) & \text{if } \min_j(|c_i^q - c_i^t|) \le th \\ th & ow \end{cases}$$

$$w(c_i^q) = \frac{Cind(c_i^q) + Cind(c_j^t)}{|Cind(c_i^q) - Cind(c_j^q)| + \frac{\max(Cind(c_k^q)) + \max(Cind(c_k^t))}{10}},$$

$$j = \text{argmin}(|c_i^q - c_j^t|)$$

where $c_i^q$ and $c_i^t$ are crease locations after crease pair based alignment in the captured and the stored finger, respectively, that do not belong to the pair of creases being aligned.

The corresponding pair obtaining the greatest fitness score is considered for final alignment. The query finger is then scaled and translated to align with the enrolled finger. A crease from the captured finger is said to be corresponding to a crease from an enrolled finger if the distance between the two creases after alignment is smaller than a threshold.

In step 615, given the enrolled fingers, the local regions extracted near the corresponding creases are matched. To match two local regions, the Red, Green, Blue (RGB) planes of the finger image strip are converted into grayscale and normalized. A normalized finger image ($I_{norm}$) may be determined using Equation (14).

$$I_{norm}(x, y) = \begin{cases} Id(I(i,j) > 0)\left(M + \sqrt{\dfrac{v_{req}}{v(x,y)}\left(\dfrac{I(x,y)-}{m(x,y)}\right)^2}\right) & \text{if } I(x,y) > m(x,y) \\ Id(I(i,j) > 0)\left(M - \sqrt{\dfrac{v_{req}}{v(x,y)}\left(\dfrac{I(x,y)-}{m(x,y)}\right)^2}\right) & ow \end{cases} \quad (14)$$

$$m(x,y) = \frac{\sum_{i,j=(x-t,y-t)}^{x+t,y+t} I(i,j) Id(I(i,j)>0)}{\sum_{i,j=(x-t,y-t)}^{x+t,y+t} Id(I(i,j)>0)}$$

$$v(x,y) = \frac{\sum_{i,j=(x-t,y-t)}^{x+t,y+t} (I(i,j) - m(x,y))^2 Id(I(i,j)>0)}{\sum_{i,j=(x-t,y-t)}^{x+t,y+t} Id(I(i,j)>0)}$$

$$Id(a) = \begin{cases} 1 & a = \text{true} \\ 0 & a = \text{false} \end{cases}$$

To determine a match score, it is assumed that S1 and S2 are two local regions to be matched. With that assumption, the match score may be determined using Equation (15).

$$\text{match}(S1, S2) = \max_{t=-y:2:y} (\text{dot}(S1, \text{clip}(vshift(S2, t)), S1)) \quad (15)$$

$$vshift(R, t) = \{S \mid S(x,y) = R(x, y+t)\}$$

$$\text{clip}(R, S) = \left\{U \mid U(x,y) = \begin{cases} R(x,y) & \text{if } S(x,y) > 0 \\ 0 & ow \end{cases}\right\}$$

$$\text{dot}(R, S) = \frac{\sum_{x,y}(255 - R(x,y))(255 - S(x,y))}{\sqrt{\sum_{x,y}(255 - S(x,y))^2}\sqrt{\sum_{x,y}(255 - R(x,y))^2}}$$

The final match score is computed as average of the individual match scores of the different local regions associated with the corresponding creases.

In another exemplary embodiment, the image normalization procedure can be replaced by another procedure such as histogram equalization. Furthermore, the image segment matching procedure can be replaced by a more sophisticated matching technique such as mutual information or other machine learning techniques. For example, the dot(R,S) function in Equation (15) can be replaced by dotM(R-S) which classifies (R-S) as a match or no match using techniques such as support vector machines, decision tree classifier or neural networks.

As described above, exemplary embodiments of the present invention have applicability in a wide variety of applications. For example, the system may be used for motion control. In such an exemplary implementation, the system follows the usual procedure to align the finger to the stored template. However, instead of simply matching the aligned finger segment to the stored template, the alignment parameters of the finger segment, in terms of x-translation, y-translation, rotation, and scaling, are compared to those of the stored template and used to control the movement of a mouse pointer. In an exemplary implementation, the mouse pointer can be a 3D pointer in case of 3D scene navigation wherein the z-translation is provided by the scaling component.

Still further, an exemplary implementation of the present invention is related to mouse tracking. In such an embodiment, only the first frame is processed using the proposed approach to align the finger. The finger is tracked in the subsequent frames using the commonly used object tracking techniques such as Kanade-Lucas-Tomasi (KLT) Tracker, mean shift tracker, etc. If the tracking algorithm requires a certain set of points on the image to be tracked, the points can be randomly sampled inside the small segments associated with each crease.

In an exemplary implementation, during the image capture step, a display screen present on the same side of the phone as the imaging sensor may be lit with a specific color. The skin-likelihood histogram is computed separately for each such illumination and during authentication the same color is lit on the display.

In another exemplary embodiment of the current invention, average brightness of the image is computed first and if its value is below a certain threshold, the system will indicate to the user, using an audio or a visual cue, that the system cannot perform correctly under the current environmental conditions and thus the traditional modes of interaction with the cell phone must be used. As an alternative, instead of computing the average brightness, this information can be accessed from other devices having the same capabilities present in the vicinity through a Bluetooth or other source of communication between the devices available.

In another exemplary embodiment of the current invention, if the finger identification is successful with significant reliability, small segments of the color image are extracted around the matched creases and used to update the skin color histogram. In order to update the histogram, a new histogram is generated using the small segments and a weighted sum of previous and the current histogram is now used as the new histogram. The weight can be computed using various heuristic techniques.

In another exemplary embodiment of the current invention, the other side of the finger is used for authentication. This would include knuckle detection and nail shape recognition. However, matching these features might require very different set of features.

An advantage of the proposed system is its relaxed requirement of user attention which significantly adds to the convenience of using the system. For example, a user receiving a call while driving can simply show a specific finger to the cell phone to either ignore or respond to the call without having to devote significant attention to the cell phone. This is important especially when a significant proportion of driving accidents can be linked to diversion of attention towards cell phones. Further, such application is also useful for those having limited sight. In that case, the user would not have to find and press specific buttons on the portable terminal in order to operate a function. In general, a portable terminal will become less intrusive and thus more convenient.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of a portable terminal for detecting a finger, the method comprising:
   capturing an image of a finger;
   generating a likelihood image of the finger from the captured image;
   localizing the finger within the likelihood image by performing a coarse localization using image moments and performing a fine localization using a Hough transform;
   determining a boundary of the finger;
   determining a location of one or more creases of the finger; and
   comparing the determined location of the one or more creases with crease locations of a finger image stored in a database.

2. The method of claim 1, wherein the generating of the likelihood image of the finger from the captured image comprises using a color-likelihood algorithm to detect a skin region of the finger.

3. The method of claim 2, wherein the using of the color-likelihood algorithm comprises using the following equation:

$$L(x,y) = C(h(x,y), s(x,y))$$

where, x and y are coordinates of a pixel of the captured image, L is the likelihood, C is a skin color histogram, $h(.,.)$ is a hue of the captured image, and $s(.,.)$ is a saturation channel of the captured image.

4. The method of claim 3, wherein the likelihood value is set to zero if a value computed using the equation is less than a threshold.

5. The method of claim 3, wherein the performing of the coarse localization comprises determining a centroid and orientation of the finger using the following equations:

$$(\bar{x}, \bar{y}) = \left( \frac{1}{m_{00}} \sum_{x,y} x L(x, y), \frac{1}{m_{00}} \sum_{x,y} y L(x, y) \right)$$

where L is the likelihood image and $$m_{00} = \sum_{x,y} L(x, y);$$

and $$\Theta = \arctan(v_y/v_x)$$

where $(v_x, v_y)$ is the largest eigenvector of the image covariance matrix given by $$H = \begin{bmatrix} \mu'_{20} & \mu'_{11} \\ \mu'_{11} & \mu'_{02} \end{bmatrix}$$

where $$\mu'_{pq} = 1/m_{00} \sum_{x,y} (x - \bar{x})^p (y - \bar{y})^q L(x, y).$$

6. The method of claim 5, wherein the determining of the boundary of the finger comprises determining a skeleton of the finger using the following equation:

$$skel(x) = \begin{cases} \dfrac{y_{top} + y_{bot}}{2} & y_{top} = \min(y \mid E(x, y) = 1, y > 0) \\ & y_{bot} = \max(y \mid E(x, y) = 1, y < 0) \\ \phi & ow \end{cases}$$

where E is the edge image.

7. The method of claim 6, wherein the determining of the location of the one or more creases of the finger comprises determining a projection profile of the finger using the following equation:

$$Proj(x) = \sum_y I(x, y)$$

where I is a grayscale image strip extracted using the skeleton.

8. The method of claim 7, wherein the determining of the location of the one or more creases of the finger further comprises determining troughs in the projection profile using the following equations:

$$C_{ind}(x) = \sum_{k=-b/2}^{b/2} f(th_{proj}(x) - Proj(x + k));$$

$$f(a) = \begin{cases} 0 & \text{if } a < 0 \\ a & \text{if } a > 0 \end{cases};$$

and $$th_{proj}(x) = \min(Proj(x - b/2), Proj(x + b/2)),$$

where a is a point along an x-axis of the projection profile, b is the size of segment of pixels of a predefined length centered at a, and $th_{proj}$ is a threshold of the segment.

9. The method of claim 8, wherein the comparing of the determined location of the one or more creases with the crease locations of the finger image stored in the database comprises determining an alignment fitness using the following equations:

$$\text{fitness}(i) = \sum_i (th - d(c_i^q)) w(c_i^q)$$

$$d(c_i^q) = \begin{cases} \min_j(|c_i^q - c_j^t|) & \text{if } \min_j(|c_i^q - c_i^t|) \leq th \\ th & ow \end{cases}$$

$$w(c_i^q) = \frac{Cind(c_i^q) + Cind(c_j^t)}{|Cind(c_i^q) - Cind(c_j^q)| + \dfrac{\max(Cind(c_k^q)) + \max(Cind(c_k^t))}{10}},$$

$$j = \operatorname{argmin}(|c_i^q - c_j^t|)$$

where $c_i^q$ and $c_i^t$ are crease locations after crease pair based alignment in the captured and the stored finger, respectively, that do not belong to the pair of creases being aligned.

10. The method of claim 1, wherein the performing of the fine localization comprises evaluating non-zero pixels of a binary image to detect a line having a width of one pixel using the following equation:

$$x\cos(\theta) + y\sin(\theta) = \rho$$

where ($\rho$) is a minimum distance of the line from an origin and $\theta$ is an angle of the line from an origin with respect to an x-axis, wherein values of pairs of $\rho$ and $\theta$ are determined for each pixel, the determined values of pairs of $\rho$ and $\theta$ are accumulated, and the highest accumulated values of pairs of $\rho$ and $\theta$ are considered as the line.

11. The method of claim 1, wherein the performing of the fine localization comprises evaluating non-zero pixels of a real image to detect a line having a width of 2k+1 pixels using the following equation:

$$x\cos(\theta) + y\sin(\theta) = \rho$$

where ($\rho$) is a minimum distance of the line from an origin and $\theta$ is an angle of the line from an origin with respect to an x-axis, wherein values of pairs of $\rho$ and $\theta$ are determined for each pixel, values of pairs of $\rho-i$ and $\theta$ are determined for each pixel for i=-k . . . k, the determined values of pairs of $\rho$ and $\theta$ and $\rho-i$ and $\theta$ are accumulated, the values of pairs of $\rho$ and $\theta$ and $\rho-i$ and $\theta$ are weighted according to a pixel value, and the highest accumulated values of pairs of $\rho$ and $\theta$ and $\rho-i$ and $\theta$ are considered as the line.

12. The method of claim 1, further comprising:
determining an alignment parameter of the captured image;
comparing the alignment parameter of the captured image with an alignment parameter of the stored finger image; and
controlling a function of the portable terminal based on a difference between the alignment parameter of the captured image and the alignment parameter of the stored finger image.

13. The method of claim 12, wherein the alignment parameter of the captured image comprises at least one of an x-translation, a y-translation, a rotation, and a scaling.

14. The method of claim 1, wherein the capturing the image of the finger comprises:
capturing the image of the finger using an imaging sensor; and
displaying a screen that is sequentially lit with a plurality of specific colors on a display unit that is on a same side of the portable terminal as the imaging sensor,
wherein, the generating of the likelihood image comprises generating separate likelihood images for each of the plurality of specific colors sequentially lit on the display unit.

15. The method of claim 1, further comprising:
determining an average brightness of the image of the finger;
determining if the average brightness is below a threshold; and
if the determined average brightness is below the threshold, providing an indication that a finger gesture detection is unavailable.

16. The method of claim 1, further comprising:
controlling a function of the portable terminal based on the comparison of the determined location of the one or more creases of the captured finger with the crease locations of the finger image stored in a database.

17. An apparatus for detecting a finger, the apparatus comprising:

an imaging sensor for capturing an image of a finger; and
a computing system for generating a likelihood image of the finger from the captured image, for localizing the finger within the likelihood image by preforming a coarse localization using image moments and performing a fine localization using a Hough transform, for determining a boundary of the finger, for determining a location of one or more creases of the finger, and for comparing the determined location of the one or more creases with crease locations of a finger image stored in a database.

18. The apparatus of claim 17, wherein the computing system generates the likelihood image of the finger from the captured image by using a color-likelihood algorithm to detect a skin region of the finger.

19. The apparatus of claim 18, wherein the using of the color-likelihood algorithm comprises using the following equation:

$$L(x,y) = C(h(x,y), s(x,y))$$

where, x and y are coordinates of a pixel of the captured image, L is the likelihood, C is a skin color histogram, h is a hue of the captured image, and s is a saturation channel of the captured image.

20. The apparatus of claim 19, wherein the likelihood value is set to zero if a value computed using the equation is less than a threshold.

21. The apparatus of claim 19, wherein the computing system performs the coarse localization by determining a centroid and orientation of the finger using the following equations:

$$(\bar{x}, \bar{y}) = \left( \frac{1}{m_{00}} \sum_{x,y} xL(x,y), \frac{1}{m_{00}} \sum_{x,y} yL(x,y) \right)$$

where L is the likelihood image and $$m_{00} = \sum_{x,y} L(x,y);$$

and $$\Theta = \arctan(v_y/v_x)$$

where $(v_x, v_y)$ is the largest eigenvector of the image covariance matrix given by $$H = \begin{bmatrix} \mu'_{20} & \mu'_{11} \\ \mu'_{11} & \mu'_{02} \end{bmatrix}$$

where $$\mu'_{pq} = 1/m_{00} \sum_{x,y} (x-\bar{x})^p (y-\bar{y})^q L(x,y).$$

22. The apparatus of claim 21, wherein the computing system determines the boundary of the finger by determining a skeleton of the finger using the following equation:

$$skel(x) = \begin{cases} \frac{y_{top} + y_{bot}}{2} & y_{top} = \min(y \mid E(x,y) = 1, y > 0) \\ & y_{bot} = \max(y \mid E(x,y) = 1, y < 0) \\ \phi & ow \end{cases}$$

where E is the edge image.

23. The apparatus of claim 11, wherein the computing system determines the location of the one or more creases of the finger by determining a projection profile of the finger using the following equation:

$$Proj(x) = \sum_y I(x,y)$$

where I is a grayscale image strip extracted using the skeleton.

24. The apparatus of claim 23, wherein the computing system determines the location of the one or more creases of the finger further by determining troughs in the projection profile using the following equations:

$$C_{ind}(x) = \sum_{k=-b/2}^{b/2} f(th_{proj}(x) - Proj(x+k));$$

$$f(a) = \begin{cases} 0 & \text{if } a < 0 \\ a & \text{if } a > 0 \end{cases};$$

and $$th_{proj}(x) = \min(Proj(x-b/2), Proj(x+b/2)),$$

where a is a point along an x-axis of the projection profile, b is the length of a segment of pixels of a predefined length centered at a, and thproj is a threshold of the segment.

25. The apparatus of claim 24, wherein the computing system compares the determined location of the one or more creases with the crease locations of the finger image stored in the database by determining an alignment fitness using the following equations:

$$\text{fitness}(i) = \sum_i (th - d(c_i^q))w(c_i^q)$$

$$d(c_i^q) = \begin{cases} \min_j(|c_i^q - c_j^t|) & \text{if } \min_j(|c_i^q - c_j^t|) \le th \\ th & ow \end{cases}$$

$$w(c_i^q) = \frac{Cind(c_i^q) + Cind(c_j^t)}{|Cind(c_i^q) - Cind(c_j^t)| + \frac{\max(Cind(c_k^q)) + \max(Cind(c_k^t))}{10}},$$

$$j = \text{argmin}(|c_i^q - c_j^t|)$$

where and $c_i^q$ and $c_i^t$ are crease locations after crease pair based alignment in the captured and the stored finger, respectively, that do not belong to the pair of creases being aligned.

26. The apparatus of claim 17, wherein the computing system performs the fine localization by evaluating non-zero pixels of a binary image to detect a line having a width of one pixel using the following equation:

$$x\cos(\theta) + y\sin(\theta) = \rho$$

where ($\rho$) is a minimum distance of the line from an origin and $\theta$ is an angle of the line from an origin with respect to an x-axis, wherein values of pairs of $\rho$ and $\theta$ are determined for each pixel, the determined values of pairs of $\rho$ and $\theta$ are accumulated, and the highest accumulated values of pairs of $\rho$ and $\theta$ are considered as the line.

27. The apparatus of claim 17, wherein the computing system performs the fine localization by evaluating non-zero pixels of a real image to detect a line having a width of 2k+1 pixels using the following equation:

$$x\cos(\theta) + y\sin(\theta) = \rho$$

where ($\rho$) is a minimum distance of the line from an origin and $\theta$ is an angle of the line from an origin with respect to an x-axis, wherein values of pairs of $\rho$ and $\theta$ are determined for each pixel, values of pairs of $\rho-i$ and $\theta$ are determined for each pixel for i=−k . . . k, the determined values of pairs of $\rho$ and $\theta$ and $\rho-i$ and $\theta$ are accumulated, the values of pairs of $\rho$ and $\theta$ and $\rho-i$ and $\theta$ are weighted according to a pixel value, and the highest accumulated values of pairs of $\rho$ and $\theta$ and $\rho-i$ and $\theta$ are considered as the line.

28. The apparatus of claim 17, wherein the computing system determines an alignment parameter of the captured image, compares the alignment parameter of the captured image with an alignment parameter of the stored finger image, and controls a function of the portable terminal based on a difference between the alignment parameter of the captured image and the alignment parameter of the stored finger image.

29. The apparatus of claim 28, wherein the alignment parameter of the captured image comprises at least one of an x-translation, a y-translation, a rotation, and a scaling.

30. The apparatus of claim 17, further comprising:
a display unit for displaying a screen that is sequentially lit with a plurality of specific colors, the display unit located on a same side of the apparatus as the imaging sensor,
wherein, the computing system generates the likelihood image by generating separate likelihood images for each of the plurality of specific colors sequentially lit on the display unit.

31. The apparatus of claim 17, wherein the computing system determines an average brightness of the image of the finger, determines if the average brightness is below a threshold, and, if the determined average brightness is below the threshold, provides an indication that a finger gesture detection is unavailable.

32. The apparatus of claim 17, wherein the computing system controls a function based on the comparison of the determined location of the one or more creases of the captured finger with the crease locations of the finger image stored in a database.

* * * * *